(12) United States Patent
Holmes

(10) Patent No.: US 6,475,065 B1
(45) Date of Patent: Nov. 5, 2002

(54) RIGID POLYMERIC CUTTING ARTICLE, A ROTARY TOOL HAVING THE ARTICLE ATTACHED THERETO, AND A METHOD OF USING

(75) Inventor: Dean S. Holmes, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/657,424

(22) Filed: Sep. 8, 2000

(51) Int. Cl.$^7$ .................................................. B24B 1/00
(52) U.S. Cl. ........................... 451/28; 451/59; 451/358; 451/359
(58) Field of Search ........................... 451/28, 59, 465, 451/466, 358, 359; 408/141, 142, 144, 145, 204, 211; 76/108.6

(56) References Cited

U.S. PATENT DOCUMENTS

| | | | |
|---|---|---|---|
| 3,892,039 A | | 7/1975 | Fisher |
| 4,435,873 A | * | 3/1984 | Pool ............................ 15/105 |
| 4,891,887 A | | 1/1990 | Witte |
| 4,920,647 A | | 5/1990 | Riley |
| 5,020,394 A | * | 6/1991 | Nakamura et al. ......... 76/108.6 |
| 5,056,176 A | | 10/1991 | Belcher |
| 5,115,697 A | * | 5/1992 | Rodriguez et al. ......... 76/108.6 |
| 5,272,940 A | * | 12/1993 | Diskin ....................... 76/108.6 |
| 5,437,074 A | | 8/1995 | White et al. |
| 5,449,254 A | | 9/1995 | Beckner |
| 5,655,861 A | | 8/1997 | Bardeen et al. |
| 5,733,074 A | * | 3/1998 | Stock et al. .................. 408/17 |
| 5,865,571 A | | 2/1999 | Tankala et al. |
| 5,879,504 A | * | 3/1999 | Winter ....................... 156/344 |
| 5,983,434 A | * | 11/1999 | Eichinger et al. ............. 15/180 |
| 6,035,536 A | | 3/2000 | Dewberry |

OTHER PUBLICATIONS

Publication by the U.S. Air Force (Technical Order 1–1–3) "Inspection and Repair of Aircraft Integral Tanks, and Fuel Cells" Paragraphs 6–8.3.3.
Fuel Tank Maintenance Airbus Industries/CD–ROM, 2000.
The American Society for Testing and Materials (ASTM), "Standard Test Method for Deflection Temperature of Plastics Under Flexural Load in the Edgewise Position," Designation: D 648–98c, pp. 58–68 (Apr. 1999).
The American Society for Testing and Materials (ASTM), "Standard Test Methods for Determining the Izod Pendulum Impact Resistance of Plastics Pendulum Impact Resistance of Plastics," An American National Standard, Designation: D 256–97, pp. 1–20 (May 1998).
The American Society for Testing and Materials (ASTM), "Standard Test Methods for Flexural Properties of Unreinforced and Reinforced Plastics and Electrical Insulating Materials," Designation: D 790–98, pp. 148–156 (Mar. 1999).

* cited by examiner

Primary Examiner—Timothy V. Eley
Assistant Examiner—Dung Van Nguyen
(74) Attorney, Agent, or Firm—Gregory D. Allen

(57) ABSTRACT

The Invention also provides the rotary tool having the article attached thereto and a method of using. The present invention relates to a cutting article having at least one rigid surface comprising a polymeric material designed for use with a rotary tool which is particularly useful for efficiently removing a material (such as a sealant, for example) from a substrate. Preferably the material is removed with minimal or no damage to the substrate.

46 Claims, 6 Drawing Sheets

RIGID POLYMERIC CUTTING ARTICLE, A ROTARY TOOL HAVING THE ARTICLE ATTACHED THERETO, AND A METHOD OF USING

FIELD OF THE INVENTION

The present invention relates to a cutting article having at least one rigid surface comprising a polymeric material designed for use with a rotary tool which is particularly useful for efficiently removing a material (such as a sealant, for example) from a substrate. Preferably the material is removed with minimal or no damage to the substrate. The invention also provides the rotary tool having the article attached thereto and a method of using.

BACKGROUND OF THE INVENTION

Elastomeric sealants or coatings are frequently applied to interior and/or exterior Estructural surfaces of manufactured articles in order to seal, eliminate or minimize corrosion, mitigate surface cracks and/or protect the surfaces from impact or chemical attack. For example, fuel tanks for aircraft are frequently coated with elastomeric sealants or coatings on their interior in order to eliminate leaks. In the event of an inevitable need for repair, however, these elastomeric sealants or coatings must be removed in order to render the underlying substrates accessible for the necessary maintenance procedures. These coatings may be removed mechanically and/or chemically. Due care must be exercised during the removal process to avoid damage to the surrounding and underlying structural surfaces.

Frequently employed mechanical devices for the removal of elastomeric sealants include manual scraper blades such as those commercially available from Exacta Plastics Incorporated (Sun Valley, Calif.) as well as similar devices with customized profiles to facilitate access to confined areas. The use of these manual scraper blades are time-intensive and labor-intensive, especially if the removal must be effected over a relatively large area.

Commercially-available chemical means, i.e., strippers, are also used, such as that commercially available under the trade designation SKYRESTORE (manufactured by Elixair International Limited and commercially available from Aerosafe Products, Incorporated, Marietta, Ga.) either alone or in conjunction with the manual scrapers described above, to remove such sealants. Use of such strippers, with or without manual scrapers, can also be time consuming. Generally, such strippers include organic solvents that may be undesirable due to their potential to cause disposal difficulties and atmospheric contamination.

SUMMARY OF THE INVENTION

A need thus exists to provide an effective mechanized means for removing material such as elastomeric sealants from substrates such as structural surfaces. I have discovered an article and a machine comprising the article, which can be used for such a purpose.

The present invention provides an article comprising:
(a) a shaft; and
(b) at least one blade attached to the shaft; wherein the article has at least one rigid cutting surface comprising a polymeric material; wherein the article is adapted to remove material from a substrate in a manner such that the substrate is at least essentially undamaged (preferably undamaged).

The present invention also provides a machine comprising a rotary tool having the above article attached thereto.

The present invention also provides a method comprising the steps of:
(a) providing a machine and a substrate, the substrate having a material to be removed thereon, the machine comprising:
  (i) a rotary tool;
  (ii) an article attached to the rotary tool; wherein the article has at least one rigid cutting surface comprising a polymeric material.
(b) activating the tool to cause the blade(s) to rotate and contacting at least one of the cutting surfaces with the material to be removed in order to remove at least some of the material from the substrate.

BRIEF DESCRIPTION OF THE DRAWINGS

FIG. 1b is a side view of the article of FIG. 1a.

FIG. 2b is a side view of the article of FIG. 2a.

FIG. 3b is a side view of the article of FIG. 3a.

FIG. 4b is a cross-sectional view of the article of FIG. 4a.

FIG. 7b is a partial cross-sectional view of the article of FIG. 7a.

DETAILED DESCRIPTION OF THE INVENTION

Figure 1A:
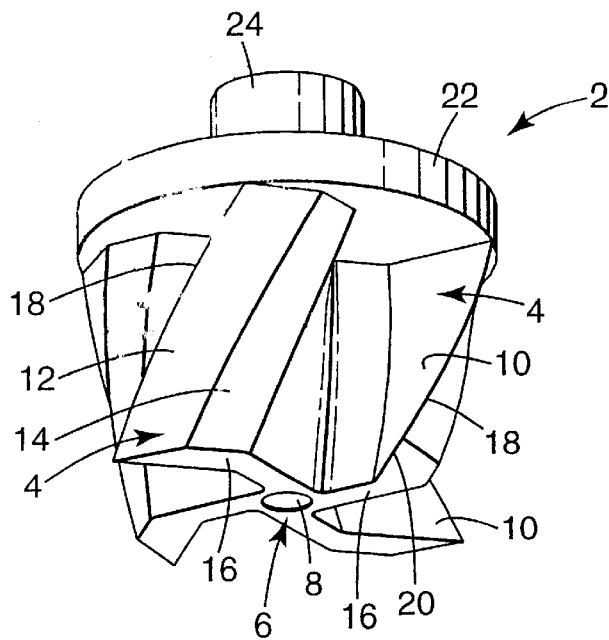
FIG. 1a is a perspective view of an embodiment of an article of the invention.

Shape of the Article of the Invention

The article of the invention has at least one blade, preferably a plurality of blades, attached to the shaft. The article may, for example, have 3, 4, 5, 6, 7, 8, etc. blades.

Typically the blades are similarly shaped and are symmetrically positioned with respect to the shaft. Preferably the blade(s) are helically disposed with respect to the shaft in order to facilitate the cutting process. The pitch of helically disposed blade(s) can vary. Typically each blade would have about a pitch of about 8 to about 20 turns per meter, preferably about 12 to about 18 turns per meter. The height of the blade(s) can vary. Each blade typically has a height ranging from about 0.5 to about 2.5 cm, more typically about 1.5 to about 2 cm. In FIG. 2b, the height of the blade measured from the blade's bottom face to top face is identified as "x".

Preferably the article of the invention has a rigid bottom cutting surface comprising a polymeric material and a rigid side cutting surface comprising a polymeric material. Preferably each blade has a beveled side cutting edge with a positive rake angle and a beveled bottom cutting edge with a positive rake angle.

For some applications it may be preferred that a juncture of a side cutting edge of the side cutting surface and a bottom cutting edge of the bottom cutting surface of each blade forms an angle as this may facilitate cutting of the material to be removed.

For some applications it may be preferred that a juncture of a side cutting edge of the side cutting surface and a bottom cutting edge of the bottom cutting surface of each blade form a curve as this may facilitate increased protection of the substrate during use.

Shaft

The shaft having the blade(s) attached thereto may, in one embodiment, be cylindrical in shape. The blades may be attached to the side(s) or bottom of the shaft, for example. In another embodiment, the shaft and the blades may be integrally formed. In another embodiment, the entire article of the invention may be integrally formed. In another embodiment, the shaft may have a hole extending partially through its bottom face in a vertical direction. In another embodiment, the shaft may have a hole, which extends all the way through the shaft in a vertical direction. The shaft typically comprises the same material as the blades as well as the means for connecting the shaft to a rotary tool. In another embodiment, the entire article may comprise the same material.

The article of the invention can be connected to a rotary tool by a variety of means. The shaft may, in one embodiment, be slid into a collet of the rotary tool, wherein the collet can be tightened to securely hold the cutter article during use. In another embodiment, an exterior surface of the shaft may be threaded. The article can thus be screwed into an appropriately designed rotary tool.

A metallic pin or mandrel may optionally be inserted into the shaft. The mandrel may be smooth or threaded, for example, a rolled or split pin. The pin or mandrel serves to provide mechanical strength reinforcement in the transverse direction. The mandrel can also be used to connect the cutter article to a rotary tool. Other means of connecting the cutter article to a rotary tool are also possible.

The article of the invention can be made by a number of different methods such as by injection molding for example. If a mandrel is to be inserted in the article, the article may, in one embodiment, be molded around the mandrel or the article, in another embodiment, can be molded and the mandrel subsequently inserted into the article.

Composition of the Article

Preferably at least one cutting surface, preferably each cutting surface (such as a bottom cutting surface and side cutting surface) of the article, the blade(s), the shaft, the article itself and the polymer(s) which they comprise have a flexural modulus of at least about 1000 MPa (more preferably at least about 2000 MPa) at 23° C. according to ASTM D790-98 (published March 1999). Such relatively stiff materials are preferred in order to rain aavoid deformation of an article either by inertial forces imparted by a rotary tool or by impaction forces exerted upon the article's encounter with the material to be removed. Preferably the article is not so hard as to cause damage to the substrate when removing material from the substrate.

Preferably at least one cutting surface, preferably each cutting surface (such as a bottom cutting surface and side cutting surface) of the article, the blade(s), the shaft, the article itself and the polymer(s) which they comprise have a toughness of at least about 15 joules/meter (more preferably at least about 30 joules/meter) according to ASTM D256A-97 (published May 1998) Izod Impact Test. When this test method is referenced to herein it is meant to refer only to the portion of the test performed using notched specimens. Preferably at least one cutting surface, preferably each cutting surface (such as a bottom cutting surface and side cutting surface) of the article, the blade(s), the shaft, the article itself and the polymer(s) which they comprise have a heat deflection temperature of at least about 100° C. (more preferably at least about 175° C.) according to ASTM D648-98c (published April 1999) at a loading of 1.82 MPa.

Polymers

The article of the present invention comprises at least one rigid cutting surface comprising polymeric material. Such polymers may be thermoplastic or thermosetting, for example. Preferably the article of the invention comprises a rigid polymeric thermoplastic material. If the polymer selected is thermoplastic, the preferred method of making the article is injection molding. If a thermosetting polymer is selected, a fabrication method known in the art as "reaction injection molding" may be employed, for example. Alternatively, a thermosetting polymer may be selected that is processable via injection molding techniques, followed by a crosslinking step such as exposing the molded article to either elevated temperature or to an otherwise suitably reactive environment.

Preferably, the article comprises a rigid thermoplastic polymer. Examples of useful polymers include but are not limited to polyolefins, polyamides, polyesters, polysulfones, poly(ether ether ketones), and polyetherimides. Most preferred are polyetherimide polymers, such as those commercially available as "ULTEM" from GE Plastics, Pittsfield, Mass.

The entire article itself or a portion of the article (such as the blades, for example) may optionally further comprise an additive selected from the group consisting of lubricants, pigments, dyes, fillers, and mechanical reinforcing agents. In the event that the article further comprises fillers or reinforcing agents, e.g., amorphous silica or glass fibers, care must be taken to avoid choosing such adjuvants that are sufficiently hard as to cause damage to the substrate upon use. Preferably the cutting surface(s) of the article and more preferably the entire article is substantially free (most preferably completely free) of abrasive particles.

Substrates

The method of the invention can be used to remove material from a variety of substrates. Examples of such substrates include but are not limited to those selected from the group consisting of metals (including but not limited to aluminum (such as alclad aluminum, etc.), steel, etc.); composites (including but not limited to carbon-carbon composites, fiberglass, glass reinforced epoxy, etc.); coated metals (including but not limited to painted metals, etc.); and glass.

The substrate would typically be harder than the material one intends to remove from it. Preferably the substrate is relatively undamaged, more preferably essentially undamaged, and most preferably undamaged as a result of employing the method of the invention to remove material from the substrate.

The method of the invention should remove at least some of the material one desires to remove, preferably a majority of the material, more preferably substantially all of the material, and most preferably all of the material.

The substrate may be part of an object such as a vehicle or structure, for example. Examples of such vehicles include, for example, aircraft, watercraft, and land vehicles. The method of the invention is particularly useful in removing materials such as sealants from a metal substrate. A specific particularly useful example would be that of removing sealant from a metal aircraft fuel tank.

Materials to be Removed

The machine of the invention can be used to remove a material one is desirous of removing from a substrate. Examples of such materials to be removed include sealants, coatings, etc. Examples of specific sealants include, for example, polysulfides, room temperature vulcanate (RTV), silicone sealants, polyurethanes, butyl mastic compounds, caulks such as acrylic latex caulks, styrene-butadiene copolymer rubbers, styene-ethylenebutylene block copolymer and terpolymer rubbers, polyisoprene, polychloroprene, olefinic elastomers, polyester elastomers, polyamide elastomers, and blends and copolymers of the aforementioned.

Examples of specific coatings, which can be removed, include, for example, elastomeric coatings and heat ablative coatings.

Materials intended for removal by the cutter article will typically be present in substantial thickness on the substrate. For example, depending on the situation, the material to be removed may have a thickness of at least about 2 mm, at least about 10 mm, or at least about 25 mm. Frequently the material to be removed will have a thickness of about 2 to about 50 mm.

Preferably the blades of the article rotate at a speed which is insufficient to cause thermal degradation of the material to be removed. Preferably generation of airborne particulate essentially does not occur, most preferably it does not occur at all, when employing the method of the invention.

Preferably the material removed is removed via cutting. In one embodiment of the method of the invention the article has a rigid bottom cutting surface comprising a polymeric material and the rigid bottom cutting surface removes at least some of the material via cutting. In another embodiment the article has a rigid side cutting surface comprising a polymeric material, wherein the rigid side cutting surface removes at least some of the material from the substrates via cutting. In another embodiment, the article has a rigid bottom cutting surface comprising a polymeric material and a rigid side cutting surface comprising a polymeric material and both the rigid bottom cutting surface and the rigid side cutting surface remove at least some of the material from the substrate via cutting.

Rotary Tools

The machine of the invention comprises a rotary tool having an article of the invention attached thereto. Examples of useful rotary tools include but are not limited to pneumatic and electric power tools. The tools may optionally be hand tools (such as a pneumatic hand tool, for example.) Preferably, such tools can drive the cutter article (under no load) at between above 500 and about 3000 RPM with sufficient torque to maintain a rotational speed under load of at least about 200 RPM. The longitudinal axis of the shaft and the intended axis of rotation of an article of the invention are typically the same. Taking the axis of rotation as a vertical axis, the end of the article intended for connection to the rotary tool is typically referred to as the top of the article and the opposite end is typically referred to as the bottom.

Figure 1B:
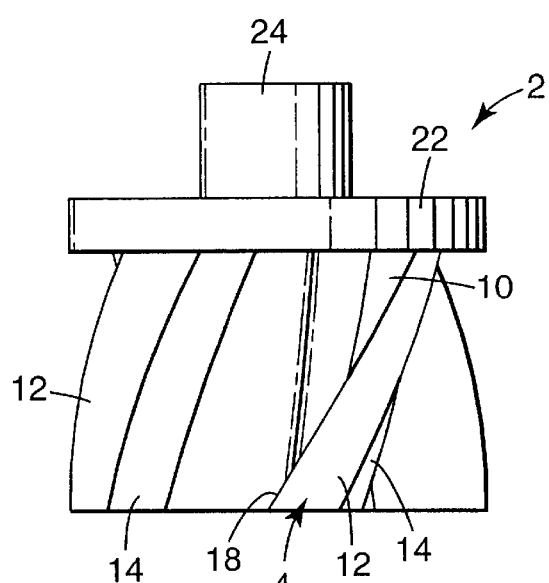
Figure 1C:
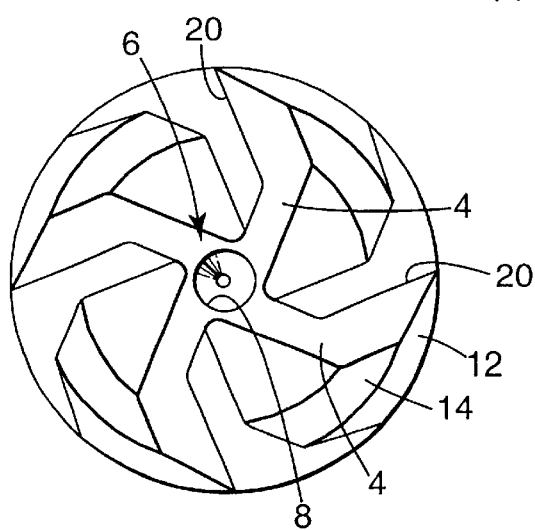
FIG. 1c is a bottom view of the article of FIG. 1b.

FIG. 1a is a perspective view of an embodiment of an article 2 of the invention. The article 2 comprises four identical blades 4 attached to central shaft 6. In this embodiment the shaft 6 and blades 4 are integrally formed. The blades 4 are helically disposed about shaft 6. The shaft 6 has a hole 8 which extends partially through the center of shaft 6. The angled nature of the blades 4 facilitates removal of material from a substrate. Each blade 4 comprises a leading face 10, an adjacent face 12, (which in this embodiment is a side face) a trailing face 14, and a bottom face 16. The intersection of the leading face 10 and adjacent face 12 forms side cutting edge 18. The intersection of leading face 10 and bottom face 16 forms bottom cutting edge 20. A top face of each blade 4 is attached to base 22. Cylinder 24, which is attached to base 22, can be used to attach the article 2 to a rotary tool. FIG. 1b is a side view of the article of FIG. 1a. FIG. 1c is a bottom view of the article 2 of FIG. 1b.

Figure 2A:
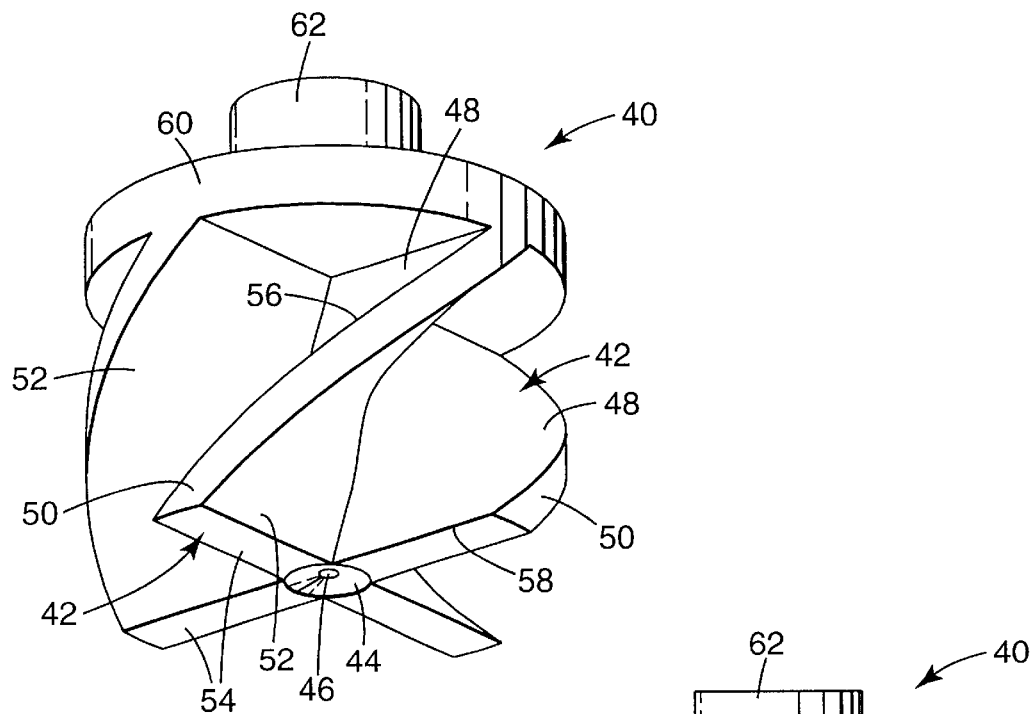
FIG. 2a is a perspective view of another embodiment of an article of the invention.
Figure 2B:
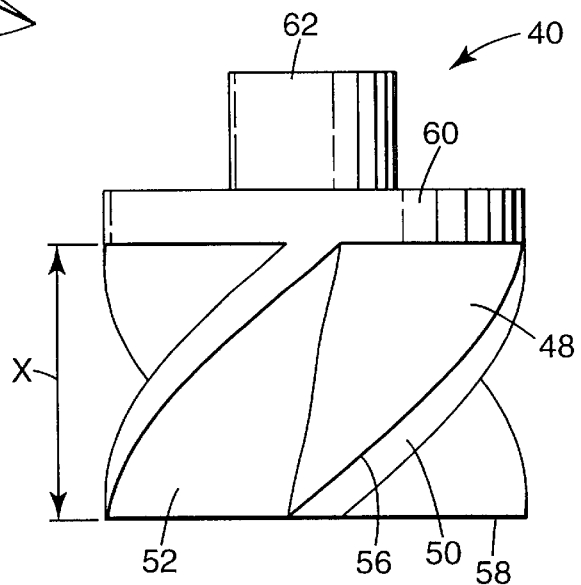
Figure 2C:
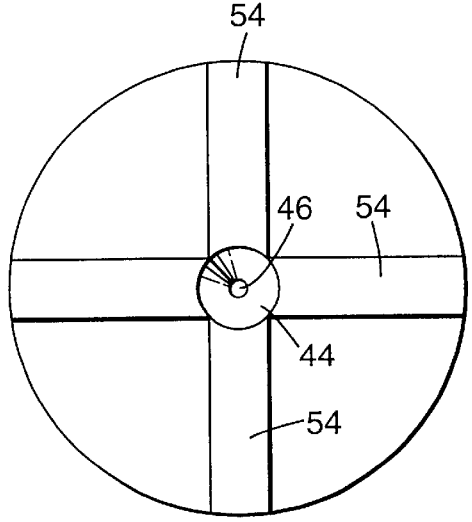
FIG. 2c is a bottom view of the article of FIG. 2b.

FIG. 2a is a perspective view of another embodiment of an article 40 of the invention. The article comprises four identical blades 42 attached to central shaft 44. The blades 42 are helically disposed about shaft 44. The shaft 44 has a hole 46 which extends partially through the center of shaft 44. Each blade 42 comprises a leading face 48, an adjacent face 50 which is also a side face, a trailing face 52, and a bottom face 54. The intersection of the leading face 48 and adjacent face 50 forms side cutting edge 56. The intersection of leading face 48 and bottom face 54 forms bottom cutting edge 58. A top face of each blade is attached to base 60. Cylinder 62, which is attached to base 60, can be used to attach the article 40 to a rotary tool. FIG. 2b is a side view of the article 40 of FIG. 2a. FIG. 2c is a bottom view of the article 40 of FIG. 2a.

Figure 3A:
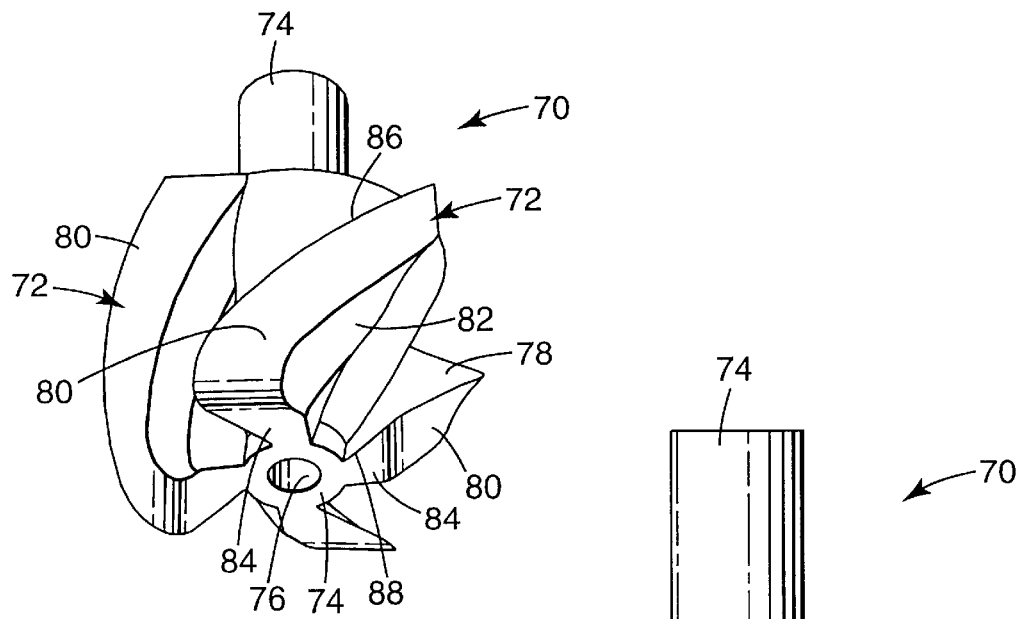
FIG. 3a is a perspective view of another embodiment of an article of the invention.
Figure 3B:
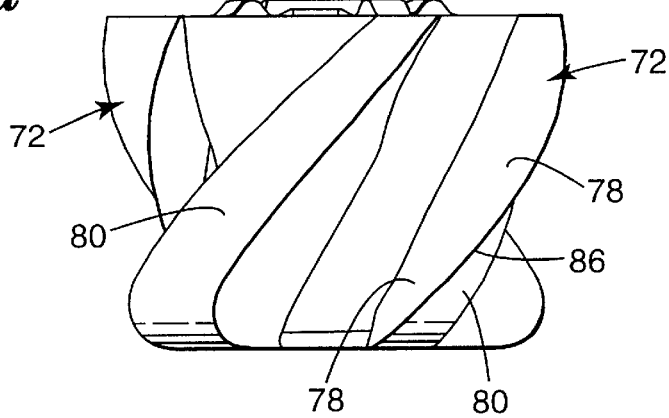
Figure 3C:
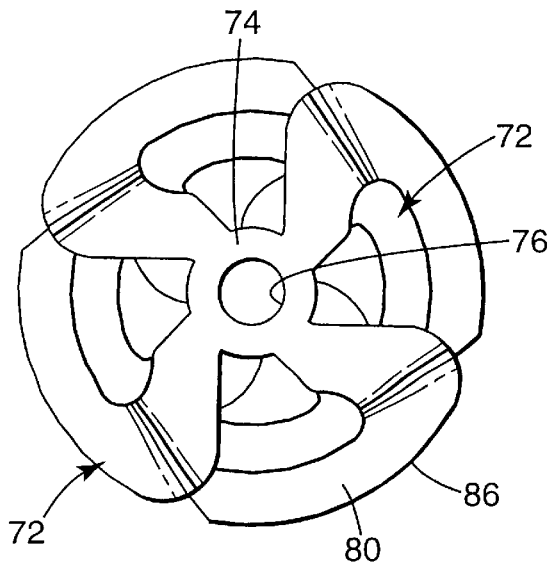
FIG. 3c is a bottom view of the article of FIG. 3b.

FIG. 3a is a perspective view of another embodiment of an article of the invention. The article 70 comprises four identical blades 72 attached to central shaft 74. The article 70 is integrally formed. The blades 72 are helically disposed about shaft 74. The shaft 74 has a hole 76 which extends partially through the center of shaft 74. Each blade 72 comprises a leading face 78, an adjacent (or side) face 80, a trailing face 82, and a bottom face 84. The intersection of the leading face 78 and the adjacent face 80 forms side cutting edge 86. The intersection of leading face 78 and bottom face 84 forms bottom cutting edge 88. The angled nature of the blades 72 facilitate removal of material from a substrate. FIG. 3b is a side view of the article of FIG. 3a. FIG. 3c is a bottom view of the article of FIG. 3b.

Figure 4A:
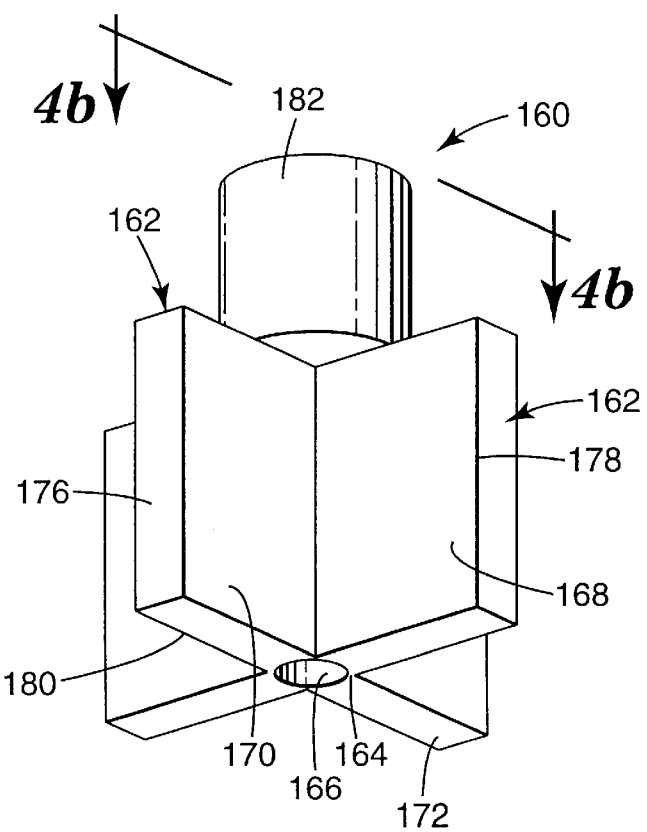
FIG. 4a is a perspective view of another embodiment of an article of the invention.

FIG. 4a is a perspective view of another embodiment of an article of the invention. The article 160 comprises four identical blades 162 attached to central shaft 164. The shaft 164 has a hole 166 which extends partially through the center of the shaft 164. Each blade 162 comprises a leading face 168, an adjacent (or side) face 176, a trailing face 170, and a bottom face 172. The intersection of the leading face 168 and adjacent face 176 forms side cutting edge 178. The intersection of leading face 168 and bottom face 172 forms bottom cutting edge 180. A top face of each blade 162 as well as the shaft 164 is attached to base 182.

With respect to each blade 162, the intersection of the leading face 168 and adjacent face 176 forms a 90° angle. The intersection of the trailing face 170 and adjacent face 176 also forms a 90° angle. Typically the direction of rotation of an article of the invention would be in the direction in which the blades are curved or angled to facilitate the cutting process. Thus the face curved or angled in the direction of the rotation would be the leading face and the opposite face would be the trailing face. Since article 160 does not have curved or angled blades which would indicate its intended direction of rotation the terms "leading face" and "trailing face" have been arbitrarily assigned.

Figure 4B:
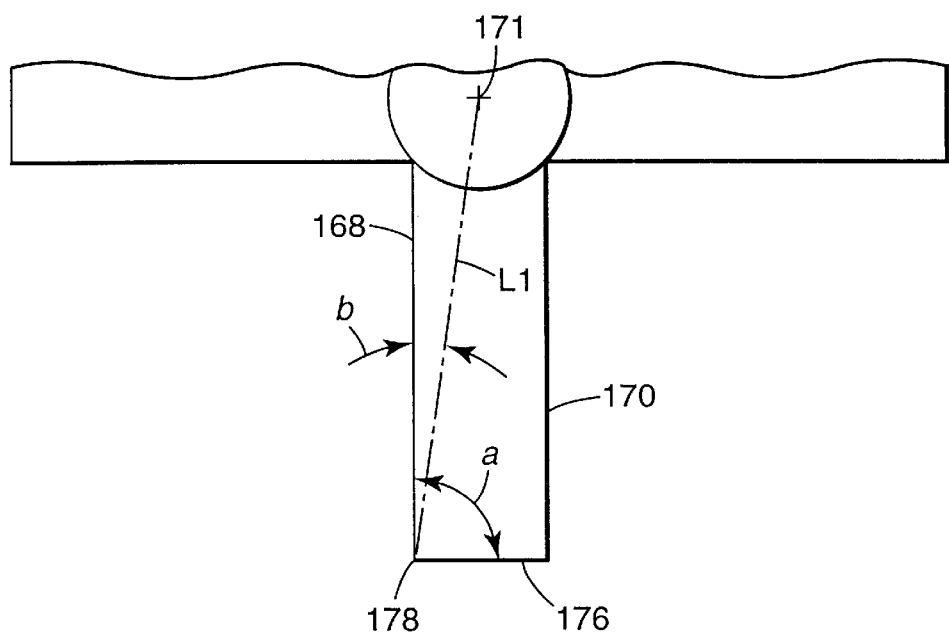

The shape of a single cutting portion of a blade may be described by with reference to a suitable cross-section. For description of the side cutting portion of a blade, a view of a horizontal cross-section through the blade is illustrative. FIG. 4b is a partial cross-sectional view of the article of FIG. 4a taken along line 4b—4b. Two angular parameters may be used to describe the side cutting portion. The line segment L1 extends from the axis of rotation 171 to the side cutting edge 178. The angle b is defined by the intersection of line segment L1 and the leading face 168 and is referred to herein as the rake angle for the side cutting edge. If the smallest angular rotation of L1 about the side cutting edge 178 to bring it colinear with the leading face 168 is counterclockwise, then b is defined as negative. If the smallest angular rotation of L1 about the side cutting edge 178 to bring it colinear with the leading face 168 is clockwise, then b is defined as positive. Preferably b is +10° or greater. The angle a is defined by the intersection of the leading face 168 and the adjacent face 176. Preferably a is between 30° and 60°.

Figure 5:
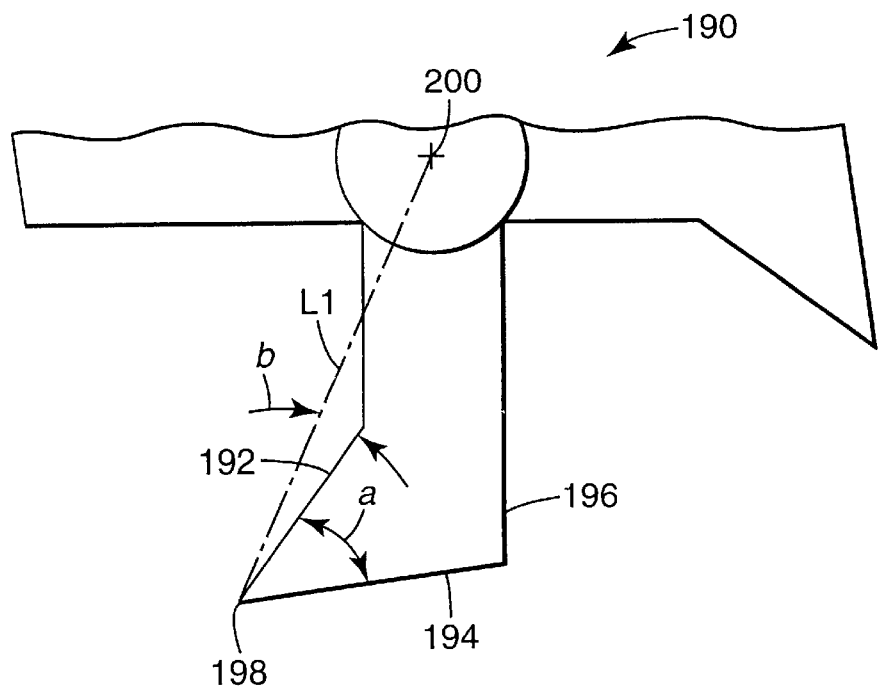
FIG. 5 is a partial cross-sectional view of another embodiment of the article of the invention.

In FIG. 4b, the value of b is −8° and the value of a is 90°. A preferred embodiment is shown in FIG. 5 where the value of b is +10° and the value of a is 45°. FIG. 5 is a cross-sectional view of an angled blade 190 of another embodiment of the article of the invention. The blade 190 has leading face 192, adjacent face 194, trailing face 196 and side cutting edge 198. The axis of rotation is identified as 200.

Figure 6:
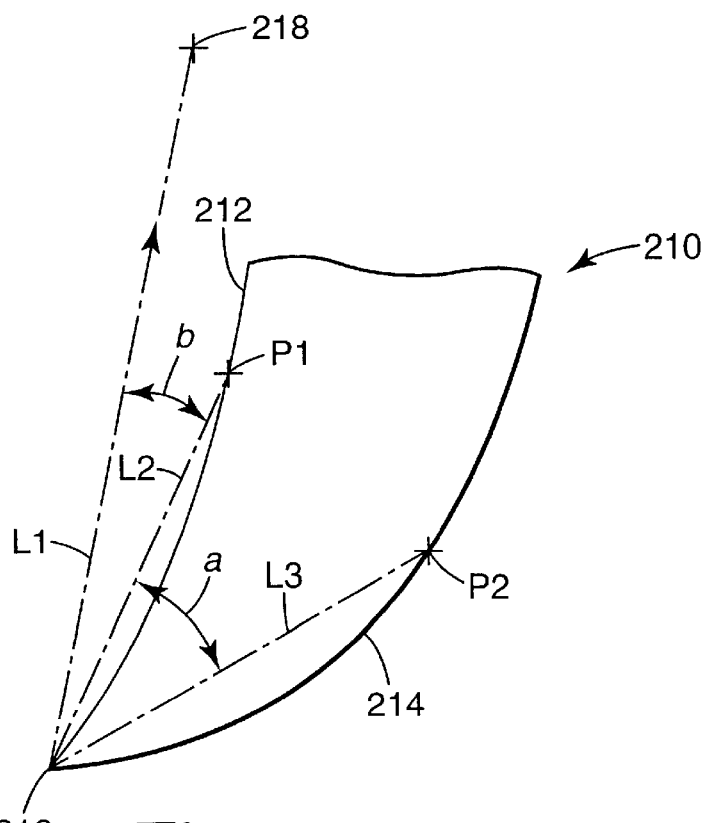
FIG. 6 is a partial cross-sectional view of another embodiment of the article of the invention.

FIG. 6 is a cross-sectional view of a crescent-shaped blade 210 of another embodiment of the article of the invention. The blade 210 has leading face 212, trailing face 214 (which is also the adjacent face) and cutting edge 216. The axis of rotation is identified as 218. In the case where a portion of the leading face 212, or the adjacent face 214, or both, are curved close to the side cutting edge, the angles a and b may be estimated as follows. Draw the line segment L1 from the side cutting edge 216 to the axis of rotation. Locate the point P1 1 mm from the side cutting edge 216 along the leading face 212. Draw the line segment L2 from the side cutting edge 216 to the point P1. Angle b is defined by the intersection of L1 and L2. Locate the point P2 1 mm from the side cutting edge 216 along the adjacent face 214. Draw line segment L3 from the side cutting edge 216 to point P2. Angle a is defined by the intersection of lines L2 and L3. In FIG. 6 b is +13° and a is 35°.

Figure 7A:
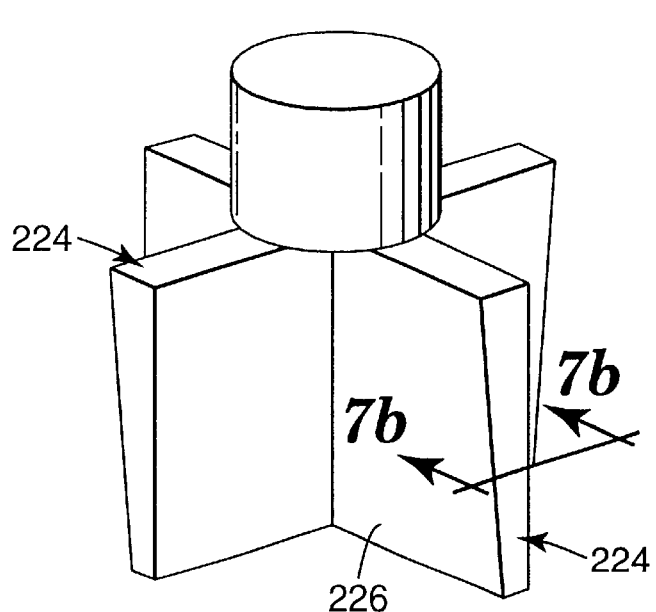
FIG. 7a is a perspective view of another embodiment of the article of the invention.
Figure 7B:
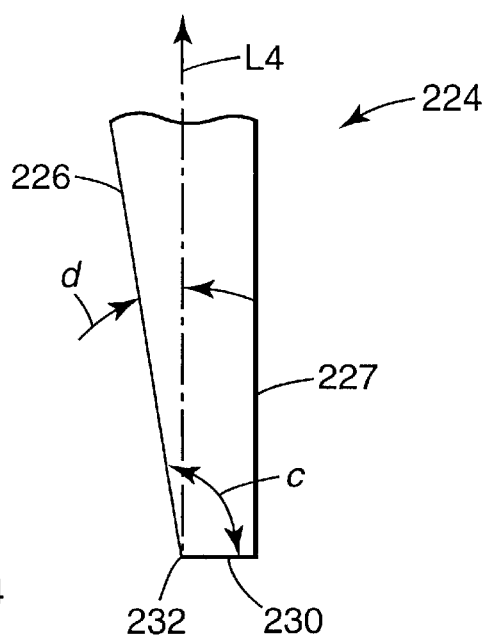

FIG. 7a is another embodiment of the article of the invention having blades 224. Each blade 224 has leading face 226 and trailing face 227. FIG. 7b is a partial cross-sectional view of the article of FIG. 7a taken along lines 7b—7b. For the bottom cutting portion of a blade, a vertical cross-section is illustrative of the structure. Two angular parameters may be used to describe this cutting portion. Referring to FIG. 7b the line segment L4 extends from the bottom cutting edge 232 parallel to the axis of rotation. The angle d is defined by the intersection of line segment L4 and the leading face 226 and is referred to herein as the rake angle for the bottom cutting edge. If the smallest angular rotation of L4 about the bottom cutting edge 232 to bring it colinear with the leading face 226 is counterclockwise, then d is defined as negative. If the smallest angular rotation of L4 about the bottom cutting edge 232 to bring it colinear with the leading face 226 is clockwise, then d is defined as positive. Preferably, d is +10° or greater. The angle c is defined by the intersection of the leading face 226 and the bottom face 230. Preferably c is between 30° and 60°. In FIG. 7b, the value of d is −9° and the value of c is 99°.

Figure 8:
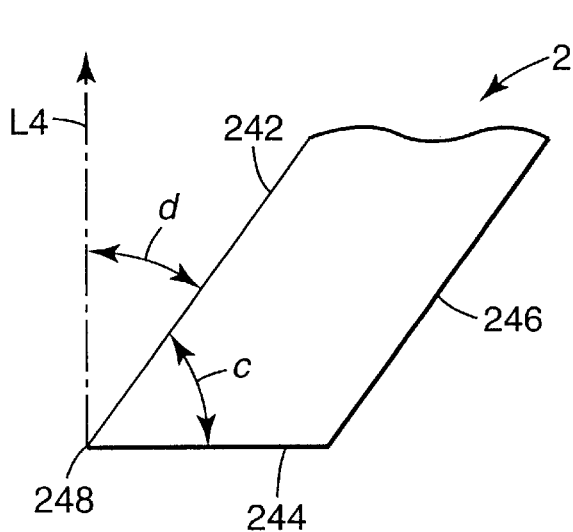
FIG. 8 is a partial cross-sectional view of another embodiment of the article of the invention.

A preferred embodiment is shown in FIG. 8 where the value of d is +35° and the value of c is 55°. FIG. 8 is a cross-sectional view of a blade 240 of another embodiment of the article of the invention. The blade has leading face 242, bottom face 244, trailing face 246, and bottom cutting edge 248.

Figure 9:
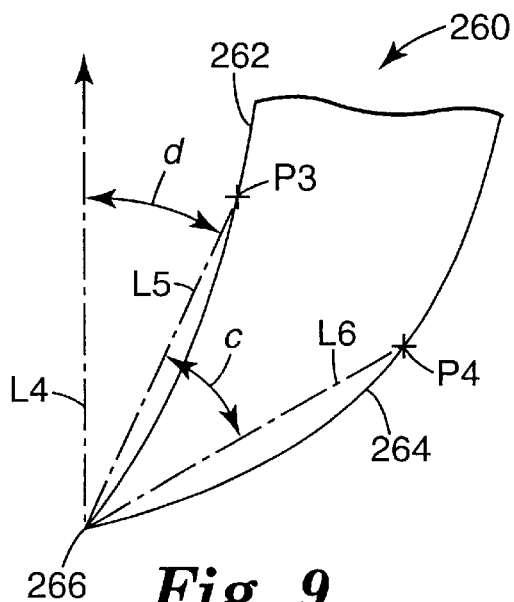
FIG. 9 is a partial cross-sectional view of another embodiment of the article of the invention.

In the case where the portion of leading face or the bottom face or both, are curved close to the bottom cutting edge, angles c and d may be estimated. This condition is shown in FIG. 9. FIG. 9 is a cross-sectional view of a blade 260 of another embodiment of the article of the invention. The blade has leading face 262, trailing face 264 (which is also a bottom face) and bottom cutting edge 266. Two angular parameters may be used to describe this cutting portion. Draw the line segment L4 from the bottom cutting edge 266 parallel to the axis of rotation. Locate the point P3 1 mm from the bottom cutting edge 266 along the leading face 262. Draw the line segment L5 from the bottom cutting edge 266 to the point P3. Angle d is defined by the intersection of L4 and L5. Locate the point P4 1 mm from the bottom cutting edge 266 along the bottom face 264. Draw line segment L6 from the bottom cutting edge 266 to point P4. Angle c is defined by the intersection of line segments L5 and L6. In FIG. 9, d is +25° and c is 33°.

Various modifications and alterations of this invention will become apparent to those skilled in the art without departing from the scope and spirit of this invention; and it should be understood that this invention will not be unduly limited to the illustrative embodiments set forth herein.

It is claimed:

1. An article comprising:
   (a) a shaft; and
   (b) at least one blade attached to the shaft;
      wherein the article has at least one rigid side cutting surface comprising a polymeric material and at least one rigid bottom cutting surface comprising a polymeric material; wherein the article is adapted to remove material from a substrate in a manner such that the substrate is at least essentially undamaged.

2. The article of claim 1 having a plurality of blades.

3. The article of claim 2 wherein the blades are similarly shaped and wherein the blades are symmetrically positioned with respect to the shaft.

4. The article of claim 1 wherein each blade and the shaft comprise a rigid polymeric material.

5. The article of claim 1 wherein the article has 3 to 8 blades.

6. The article of claim 1 wherein the article has 4 blades.

7. The article of claim 1 wherein each blade has a height ranging from about 0.5 to about 2.5 cm.

8. The article of claim 1 wherein each blade has a height ranging from about 1.5 to about 2 cm.

9. The article of claim 1 wherein the article comprises a rigid polymeric thermoplastic material.

10. The article of claim 1 wherein a juncture of a side cutting edge of the side cutting surface and a bottom cutting edge of the bottom cutting surface of each blade forms an angle.

11. The article of claim 1 wherein an exterior surface of a juncture of a side cutting edge of the side cutting surface and a bottom cutting edge of the bottom cutting surface of each blade forms a curve.

12. The article of claim 1 wherein an exterior surface of the shaft is threaded.

13. The article of claim 1 wherein a mandrel is present within the shaft.

14. The article of claim 1 wherein the rigid cutting surface further comprises an additive selected from the group consisting of lubricants, pigments, dyes, and mechanical reinforcing materials.

15. A machine comprising:
a rotary tool having the article of claim 1 attached thereto.

16. The machine of claim 15 wherein the rotary tool is a pneumatic hand tool.

17. A method comprising the steps of:
(a) providing the machine of claim 15 and a substrate, the substrate having a material to be removed thereon;
(b) activating the tool in order to cause each blade of the article to rotate and contacting at least one of the rigid cutting surfaces with the material to be removed in order to remove at least some of the material from the substrate.

18. The method of claim 17 wherein the substrate is metal and the material to be removed from the substrate is a sealant.

19. The method of claim 17 wherein at least a majority of the material is removed from the substrate and wherein the substrate is essentially undamaged during the removal of the material.

20. The method of claim 17 wherein the substrate is part of an aircraft.

21. The method of claim 17 wherein the substrate comprises a material selected from the group consisting of composites, metals, coated metals, and glass.

22. The method of claim 17 wherein the material to be removed is selected from the group consisting of coatings and sealants.

23. The method of claim 17 wherein the material to be removed has a thickness of at least about 2 mm.

24. The method of claim 17 wherein the material to be removed has a thickness of at least about 10 mm.

25. The method of claim 17 wherein the material to be removed has a thickness of at least about 25 mm.

26. The method of claim 17 wherein the material removed is removed via cutting.

27. The method of claim 17 wherein the article has a rigid bottom cutting surface comprising a polymeric material, wherein the rigid bottom cutting surface removes at least some of the material from the substrate via cutting.

28. The method of claim 17 wherein the article has a rigid side cutting surface comprising a polymeric material, wherein the rigid side cutting surface removes at least some of the material from the substrate via cutting.

29. The method of claim 17 wherein the article has a rigid bottom cutting surface comprising a polymeric material and a rigid side cutting surface comprising a polymeric material, wherein both the rigid bottom cutting surface and the rigid side cutting surface remove at least some of the material from the substrate via cutting.

30. The method of claim 17 wherein the blades of the article rotate at a speed which is insufficient to cause thermal degradation of the material to be removed.

31. The method of claim 17 wherein generation of airborne particulate essentially does not occur.

32. An article comprising:
(a) a shaft; and
(b) at least one blade attached to the shaft;
wherein the article has at least one rigid cutting surface comprising a polymeric material;
wherein the article is adapted to remove material from a substrate in a manner such that the substrate is at least essentially undamaged; the article having a plurality of blades; wherein the blades are similarly shaped;
wherein the blades are symmetrically positioned with respect to the shaft; and
wherein the blades are helically disposed with respect to the shaft.

33. The article of claim 32 wherein each blade has a pitch of about 8 to about 20 turns per meter.

34. The article of claim 32 wherein each blade has a pitch of about 12 to about 18 turns per meter.

35. An article comprising:
(a) a shaft; and
(b) at least one blade attached to the shaft;
wherein the article has at least one rigid cutting surface comprising a polymeric material;
wherein the article is adapted to remove material from a substrate in a manner such that the substrate is at least essentially undamaged; and
wherein each rigid cutting surface comprising a polymeric material has a flexural modulus of at least about 1000 MPa at 23° C. according to ASTM D790-98.

36. The article of claim 35 wherein each rigid cutting surface comprising a polymeric material has a flexural modulus of at least about 2000 MPa at 23° C. according to ASTM D790-98.

37. The article of claim 35 wherein each rigid cutting surface comprising a polymeric material has a heat deflection temperature of at least about 100° C. according to ASTM D648-98c at a loading of 1.82 MPa.

38. The article of claim 35 wherein each rigid cutting surface comprising a polymeric material has a heat deflection temperature of at least about 175° C. according to ASTM D648-98c at a loading of 1.82 MPa.

39. An article comprising:
(a) a shaft; and
(b) at least one blade attached to the shaft;
wherein the article has at least one rigid cutting surface comprising a polymeric material;
wherein the article is adapted to remove material from a substrate in a manner such that the substrate is at least essentially undamaged; and
wherein each rigid cutting surface comprising a polymeric material each has a toughness of at least about 15 joules/meter according to ASTM D256A-97 Izod Impact Test.

40. The article of claim 39 wherein each rigid cutting surface comprising a polymeric material each has a toughness of at least about 30 joules/meter according to ASTM D256A-97 Izod Impact Test.

41. An article comprising:
(a) a shaft; and
(b) at least one blade attached to the shaft;
wherein the article has at least one rigid side cutting surface comprising a polymeric material and at least one rigid bottom cutting surface comprising a polymeric material;
wherein the article is adapted to remove material from a substrate in a manner such that the substrate is at least essentially undamaged;
wherein the rigid cutting surface is free of abrasive particles.

42. An article suitable for removing an elastomeric sealant from an aluminum coated substrate, the article comprising:
a shaft; and
a blade attached to the shaft;
wherein the blade has a rigid side cutting surface comprising a polymeric material and a rigid bottom cutting surface comprising a polymeric material;
wherein when the article is in an operating mode, the article is rotated about the shaft and the blade is positioned against the elastomeric sealant, the elastomeric sealant is removed from the aluminum coated substrate without removing portions of the aluminum coated substrate if the blade comes in contact with the aluminum coated substrate.

43. The article of claim 42 having a plurality of blades, wherein the blades are similarly shaped and wherein the blades are symmetrically positioned with respect to the shaft.

44. The article of claim 43 wherein each blade has a rigid bottom cutting surface comprising a polymeric material and a rigid side cutting surface comprising a polymeric material.

45. The article of claim 42 wherein each rigid cutting surface further comprises an additive selected from the group consisting of lubricants, pigments, dyes, and mechanical reinforcing materials.

46. The article of claim 42 wherein each rigid cutting surface comprises a polymeric material having a flexural modulous of at least about 1000 MPa at 23° C. according to ASTM D790-98.

* * * * *

UNITED STATES PATENT AND TRADEMARK OFFICE
CERTIFICATE OF CORRECTION

PATENT NO. : 6,475,065 B1
DATED : November 5, 2002
INVENTOR(S) : Holmes, Dean S.

It is certified that error appears in the above-identified patent and that said Letters Patent is hereby corrected as shown below:

Title page,
Item [56], References Cited, FOREIGN PATENT DOCUMENTS, insert:
-- EP        0155216      9/85
   WO      99/23180   05/1999 --.

Column 1,
Line 20, delete "Estructural" and insert in place thereof -- structural --.

Column 3,
Line 60, delete "rain" following "to".
Line 60, delete "aavoid" and insert in place thereof -- avoid --.

Signed and Sealed this

Third Day of August, 2004

JON W. DUDAS
*Acting Director of the United States Patent and Trademark Office*